United States Patent
Zeng et al.

(10) Patent No.: US 7,409,115 B2
(45) Date of Patent: Aug. 5, 2008

(54) METHOD AND APPARATUS FOR SPECTRUM DECONVULTION AND RESHAPING

(75) Inventors: Ke-Cai Zeng, Fremont, CA (US); Xuandong Hua, Mountain View, CA (US)

(73) Assignee: Sunrise Telecom Incorporated, San Jose, CA (US)

( * ) Notice: Subject to any disclaimer, the term of this patent is extended or adjusted under 35 U.S.C. 154(b) by 0 days.

(21) Appl. No.: 11/464,583

(22) Filed: Aug. 15, 2006

(65) Prior Publication Data

US 2006/0291775 A1    Dec. 28, 2006

Related U.S. Application Data

(63) Continuation of application No. 10/981,899, filed on Nov. 4, 2004, now Pat. No. 7,113,666.

(60) Provisional application No. 60/576,909, filed on Jun. 3, 2004.

(51) Int. Cl.
  *G02F 1/295*   (2006.01)
  *G02F 1/01*    (2006.01)

(52) U.S. Cl. ............... 385/4; 385/24; 385/5; 385/1
(58) Field of Classification Search ............ 385/24, 385/5
See application file for complete search history.

(56) References Cited

U.S. PATENT DOCUMENTS 6,907,197 B2    6/2005   Heath et al.
2002/0154353 A1   10/2002   Heath et al.

*Primary Examiner*—Frank G Font
*Assistant Examiner*—Eric Wong
(74) *Attorney, Agent, or Firm*—Mikio Ishimaru

(57) ABSTRACT

A method and apparatus for filter spectrum deconvolution and reshaping include providing a filter output of a spectrum signal and determining the intensity and wavelength of the spectrum signal at each spectral peak. The filter output is characterized as an integral of convolution of a spectrum signal function and a filter function. Transformation are then performed on the filter output to deconvolve and remove the undesirable filter function and add a desirable filter function to reshape the output filter spectrum.

10 Claims, 6 Drawing Sheets

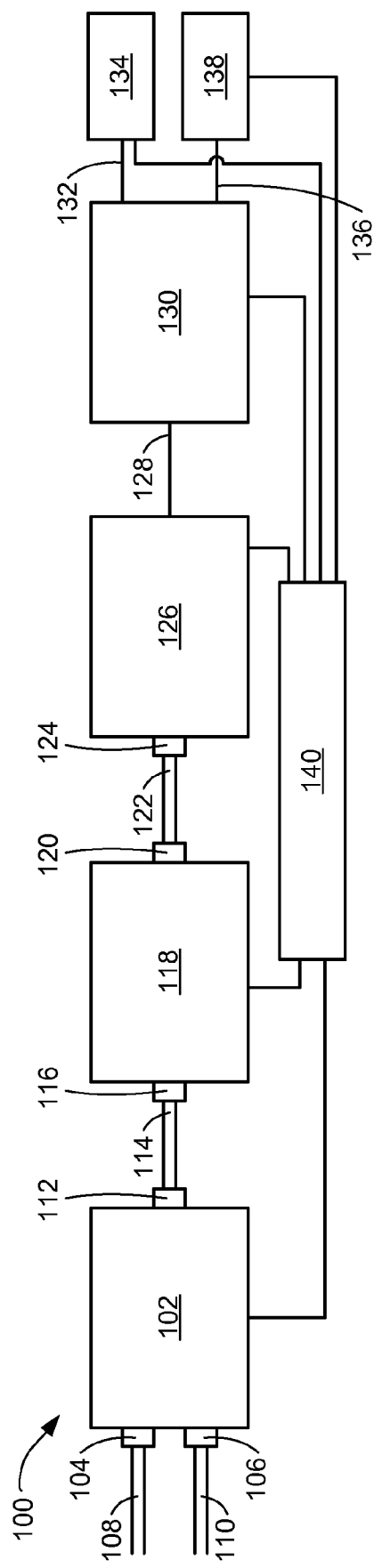
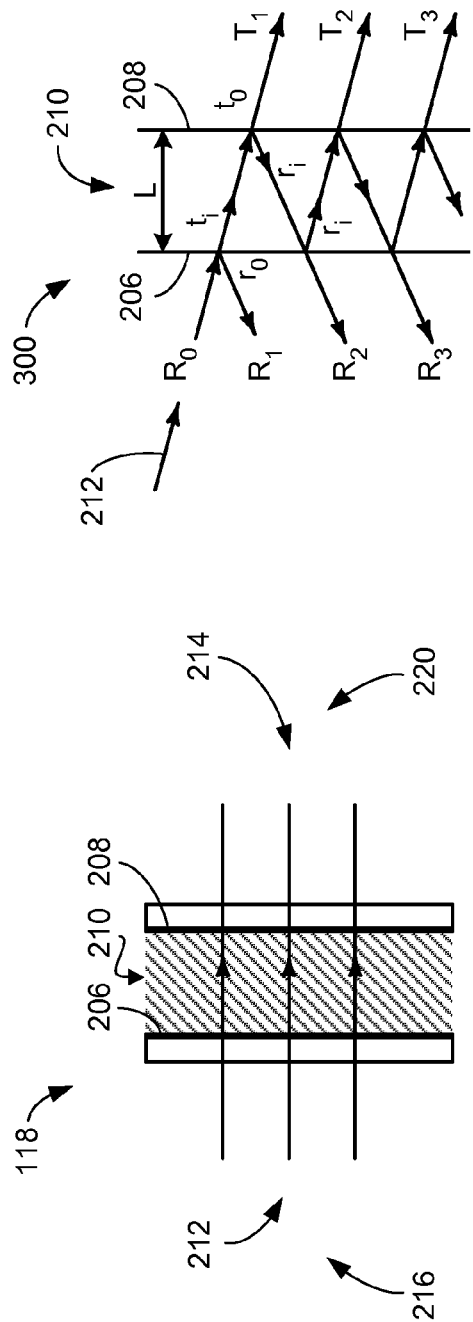
FIG. 1
FIG. 2
FIG. 3

METHOD AND APPARATUS FOR SPECTRUM DECONVULTION AND RESHAPING

CROSS-REFERENCE TO RELATED APPLICATIONS

This application is a continuation of U.S. patent application Ser. No. 10/981,899 filed Nov. 4, 2004 now U.S. Pat. No. 7,113,666, and claims the benefit of U.S. Provisional Patent Application Ser. No. 60/576,909 filed Jun. 3, 2004.

TECHNICAL FIELD

The present invention relates generally to optical spectrum analysis, and more particularly to the deconvolution and reshaping of optical spectra obtained from optical filtering devices, such as an optical diffraction grating, an optical tunable filter, and so forth.

BACKGROUND ART

The fiber optics telecommunications area includes such technologies as fiber optical cables and fiber optical networks. Fiber optical networks carry a great variety of everyday information, such as conversations, data communications (e.g., fax messages), computer-to-computer data transfers, cable television, the Internet, and so forth. Such information signals are transported between cities as well as from place to place within cities. Due to the rapidly increasing amounts of such communication traffic, the increased capacity of fiber optical cables is more and more necessary, compared to the lower capacities of older metallic wire cables.

An optical fiber cable is typically composed of a bundle of individual optical fibers. One single optical fiber can carry thousands of data and communication signals on a single wavelength of light. That same single optical fiber can also carry multiple wavelengths of light, thus enabling it to carry many, many multiple optical signals at the same time. Each wavelength alone can carry data transferring at a rate over 10 Gbit/s.

To maintain communications over such optical networks, it is necessary to perform a variety of sensitive analyses, such as measuring the optical power, wavelength, and the optical signal-to-noise ratio of the optical signals at each of the wavelengths traveling through the optical fiber. Such analysis is carried out by an analytical tool called an optical spectrum analyzer ("OSA"). The OSA performs optical spectrum analysis (also referred to as "OSA"), which, as indicated, is the measurement of optical power as a function of wavelength.

OSA is typically performed by passing an optical signal to be analyzed through a tunable optical filter. "Tunable" means that the filter can be adjusted to resolve or pick out the individual components (wavelengths) of the optical signal.

Three basic types of filters are widely used to make OSAs: diffraction gratings, Fabry-Perot ("FP") filters, and Michelson interferometers. A tunable FP filter ("TFPF") has many advantages for OSA. Principal among these are its relatively simple design, small size, fast speed, ease of control, and its great sensitivity for distinguishing optical signals that are very closely spaced (i.e., signals that have frequencies or wavelengths that are very nearly the same.)

However, as compared with a diffraction grating with the same 3-dB bandwidth (which is defined as the magnitude of wavelength or frequency difference between the left and right spectral positions at 3-dB down from the peak position), the transmission profile of a TFPF has a relatively "broad skirt". The broad skirt means that beyond the 3-dB bandwidth ("BW") spectrum position, for example, the TFPF has a relatively slow decay of the rejection ratio to optical signals that are nearby in frequency or wavelength to the signals of interest. Such a broad skirt can be a considerable disadvantage for TFPFs when used to measure the optical-signal-to-noise-ratio ("OSNR") of signals of a wavelength division multiplexing ("WDM") system. This can allow signals from nearby, or adjacent, wavelengths to leak through and raise the "noise" floor artificially. The relatively broad skirt admits cross talk from adjacent WDM channels, thereby limiting the FP OSA's dynamic range ("DR") for OSNR measurements.

In contrast, with the same 3-dB BW the transmission profile of a diffraction grating has a much steeper skirt, but it is not so sensitive at distinguishing optical signals that are very closely spaced as compared with a TFPF. Theoretically, every optical filter admits cross talk from adjacent WDM channels. Due to its steeper skirt, a diffraction grating has much smaller cross talk than the FP filter with the same 3-dB BW.

Thus, a considerable need remains for methods and apparatus that can greatly enhance the DR for OSNR measurements of a FP filter-based OSA. In view of the ever-increasing need to save costs and improve efficiencies, it is more and more critical that answers be found to these problems.

Solutions to these problems have been long sought but prior developments have not taught or suggested any solutions and, thus, solutions to these problems have long eluded those skilled in the art.

DISCLOSURE OF THE INVENTION

The present invention provides a method and apparatus for filter spectrum deconvolution and reshaping. A filter output of a spectrum signal is provided, and the optical power intensity of the spectrum signal at each predetermined wavelength is determined. The filter output is characterized as a convolution of integral of an input signal function and a filter function. Transformations are then performed on the filter output to deconvolve the two functions, and the filter output spectrum is reshaped.

Certain embodiments of the invention have other advantages in addition to or in place of those mentioned above. The advantages will become apparent to those skilled in the art from a reading of the following detailed description when taken with reference to the accompanying drawings.

BRIEF DESCRIPTION OF THE DRAWINGS

FIG. 1 is a block diagram of an optical spectrum analyzer according to the present invention;

FIG. 2 is a schematic representation of a tunable Fabry-Perot interferometer;

FIG. 3 is a vector diagram depicting the light beams and attendant electric fields in the tunable Fabry-Perot interferometer of FIG. 2;

BEST MODE FOR CARRYING OUT THE INVENTION

Figure 4:
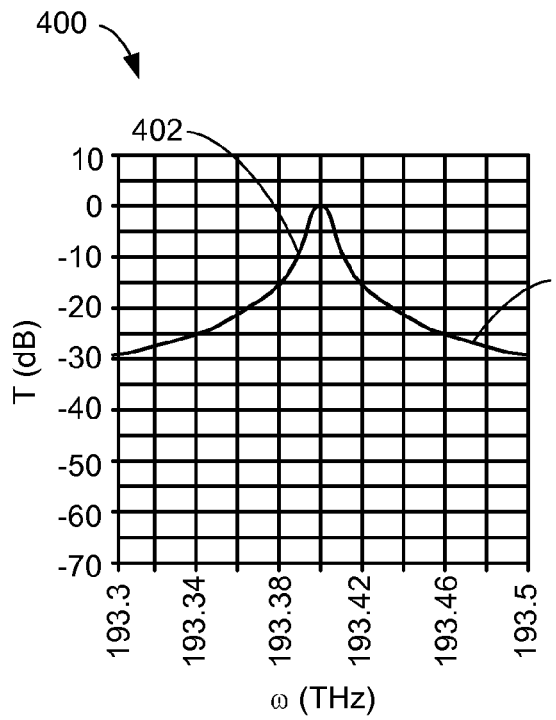
FIG. 4 shows a Lorentzian filter transmission profile.

In the following description, numerous specific details are given to provide a thorough understanding of the invention. However, it will be apparent that the invention may be practiced without these specific details. In order to avoid obscuring the present invention, some well-known circuits and system configurations are not disclosed in detail. Likewise, for clarity of presentation, the drawings showing embodiments of the device are semi-diagrammatic and may not necessarily be to scale. In addition, the same numbers are ordinarily used in the drawing FIGS. to relate to the same or functionally similar elements.

An optical spectrum analyzers ("OSA") is used to perform optical spectrum analysis (also referred to as "OSA", according to the context), which is typically performed by passing an optical signal through a tunable optical filter. The optical signal may be referred to as an "optical spectrum signal" since it contains a spectrum of many different signal wavelengths. The tunable optical filter then resolves or picks out the individual wavelength components of the optical signal. The minimum wavelength spacing that can be resolved reliably between two spectral components of the optical spectrum signal is called the spectral resolution of the OSA. To achieve high spectral resolution, the filter should have a narrow enough 3-dB bandwidth.

For many measurements, the various spectral components to be measured are not of equal amplitudes. One example is the measurement of side-mode suppression of a distributed feedback laser. ("Side-mode suppression" refers to the suppression of unwanted longitudinal propagation modes on either side of the desired longitudinal mode. The degree to which the unwanted modes are suppressed is called the "side-mode suppression ratio".) For this measurement, the 3-dB bandwidth of the filter is not the only concern. Also important is the filter shape, which is specified in terms of the optical rejection ratio ("ORR") at a certain distance, for example at ±25 GHz, away from the main transmission frequency.

The Fabry-Perot ("FP") filter is one of the commonly used filters to build an OSA. It consists of a cavity bounded on each end by two parallel, partially silvered, highly reflecting mirrors that can be moved in relation to each other. The transmission spectrum of the FP cavity, as a function of wavelength, exhibits peaks of large transmission corresponding to resonances of the cavity.

The varying transmission function of the FP cavity is caused by interference between the multiple reflections of light between the two reflecting surfaces. Constructive interference occurs if the transmitted beams are in phase, and this corresponds to a high-transmission peak of the FP cavity. If the transmitted beams are out-of-phase, destructive interference occurs, and this corresponds to a transmission minimum. Whether the multiply-reflected beams are in-phase or not depends on the wavelength of the light, the angle the light travels through the cavity, the distance between the reflecting surfaces of the mirrors (i.e., the "length" of the cavity), and the refractive index of the medium between the reflecting surfaces.

Because the mirrors can be moved to change the distance between their reflecting surfaces, the FP cavity can be used as a tunable filter. Such a tunable FP filter ("TFPF") can be made to have a very narrow 3-dB bandwidth ("BW"), but it still has a relative broad 20.0-dB BW—i.e., a broad "skirt". (Cf. the skirt 404 of the Lorentzian filter curve 402 in FIG. 4.)

One of the major advantages of a FP filter is its very narrow 3-dB bandwidth. A FP filter-based OSA would thus have a very high spectral resolution, which allows it to measure laser chirp (i.e., the wavering of the optical frequency of a laser during a pulse), for example. However, due to the broad skirt, the TFPF's ORR would be limited. For example, a TFPF with a value of finesse as high as 7200 and Free Spectrum Range ("FSR") of 180 nm would still have an ORR less than 25.0 dB at ±25.0 GHz. ("Finesse" is the ratio of spectral line spacing to line width in a series of regularly spaced interferometer fringe lines.)

For some applications, such a broad skirt is inadequate. For example, in a dense wavelength division multiplexing ("DWDM") system with 50.0 GHz spacing, an ORR as high as 35.0 dB at ±25 GHz is desirable. Otherwise, the broad-skirt transmission profile of the TFPF can introduce cross talk or interference between adjacent DWDM channels, which limits the ORR and the dynamic range ("DR") of the OSA for optical signal-to-noise ratio measurements ("OSNR").

As taught by the present invention, it has been discovered that mathematical deconvolution and reshaping methods can solve and overcome this significant drawback of the FP filter, and can greatly enhance the DR for OSNR measurements of a FP filter-based OSA. In one aspect of the present invention, the output of the filter is first characterized as an integral of convolution of two mathematical functions. The first function is the input optical signal function before the filter. The second function is a filter function—in this case, the function of transmission of the FP tunable filter. So the interaction of the optical signal and the tunable filter produces an output from the FP filter that is a mathematical integral of convolution of these two mathematical functions.

The present invention then teaches and applies transformations, as appropriate, to the FP filter output to effectively remove the FP filter function which has a broad skirt from the output and add another desirable filter function (such as a Gaussian function) which has a steeper skirt onto it so that the output optical signal spectrum can be reshaped and improve the dynamic range for signal-to-noise-ratio measurements. This enables FP filter-based optical spectrum analyzers to have not only a high spectral resolution, but also a high ORR. Such response characteristics are very desirable not only for DWDM optical spectrum monitoring purposes, but for many other applications as well.

Referring now to FIG. 1, therein is shown a block diagram of an OSA 100 according to the present invention. The OSA 100 includes an optical switch 102 having input ports 104 and 106. The input port 104 on one branch or arm of the optical switch 102 is connected to a single mode optical fiber 108 that is carrying the optical signal that is to be tested. Together, the optical fiber 108 and the input port 104 function as an optical signal input for the OSA 100.

Similarly, the input port 106 on the other arm of the optical switch 102 is connected to a single mode optical fiber 110 that is carrying a wavelength reference optical signal. Together, the optical fiber 110 and the input port 106 function as a wavelength reference signal input for the OSA 100.

The output port 112 of the optical switch 102 is connected by an optical fiber 114 to the input port 116 of a TFPF 118. The output of the TFPF 118, in turn, is connected from its output port 120 by an optical fiber 122 to the input port 124 of a detector 126. The detector 126, which is the receiver for the optical signal selected by the TFPF 118, is connected by a line 128 to an analyzer 130. A line 132 connects the analyzer 130 to a display 134 (such as a video display or a plotter), and a line 136 connects the analyzer 130 to a recorder 138. Operation of the OSA 100 can be coordinated, as desired, by a computer 140 connected to the optical switch 102, the TFPF 118, the detector 126, the analyzer 130, the display 134, and the recorder 138. Together, the detector 126, the analyzer 130, and the computer 140, in various aspects as appropriate, constitute circuitry for performing the various functions of the present invention, as further described herein.

Referring now to FIG. 2, therein is shown a schematic representation of a typical tunable FPI ("TFPI"), utilized in the present invention as the TFPF 118 in the OSA 100 (FIG. 1). The TFPF 118 includes mirrors 206 and 208 that are partially reflective. The mirrors 206 and 208 are separated by a gap, such as a cavity 210, filled with a particular dielectric medium such as air, glass, and so forth. Light rays 212 enter the TFPF 118, pass through it, and then exit the TFPF 118 as filtered light rays 214.

As indicated, the integrated output of the tunable filter can be characterized as an integral of convolution of an optical input signal function and a tunable filter function. Specifically, the light rays 212, having the spectral distribution to be analyzed, are then characterized as an optical input signal function 216. The effect of the TFPF 118 on the optical input signal function 216 is characterized by a filter function 218 of the TFPF 118. During the process of tuning the TFPF, the filtered light rays 214 are summed together to be characterized as an integral of convolution 220 of the optical input signal function 216 and the tunable filter function 218.

Referring now to FIG. 3, therein is shown a vector diagram 300 depicting the interactions and the analysis of the incident, reflected, and transmitted light beams and their attendant electric fields in the TFPF 118 (FIG. 2). The incident electric field $R_0$ of the light rays 212 is partially reflected at the mirror 206 with a factor of $r_o$ (for "reflected outside" the cavity 210), and partially transmitted with a factor $t_i$ (for "transmitted inside" the cavity 210). When the transmitted field with factor $t_i$ in the cavity 210 passes out of the cavity 210 through the mirror 208, it appears delayed and multiplied with factor $t_o$ behind the mirror 208. The reflected rays $R_1$, $R_2$, $R_3$, and so on, from the mirror 206, will experience maximum destructive interference, and the transmitted rays $T_1$, $T_2$, $T_3$, and so on, from the mirror 208, will experience maximum constructive reinforcement, when the following equation is met:

$$\frac{2\pi nL}{\lambda} = m\pi, \tag{1}$$

where m is any positive integer, L is the length of the resonant cavity (e.g., the cavity 210), n is the refractive index of the medium inside the resonant cavity, and $\lambda$ is the wavelength of the optical signal and hence of the transmitted light wave. The following equation then establishes the resonant frequencies $f_m$ of the FP cavity:

$$f_m = \frac{c}{2Ln} m \tag{2}$$

The mode spacing is defined as the FSR of the FPI.

In terms of the frequency f of the light wave, the FSR is:

$$FSR(f) = \frac{c}{2Ln} \tag{3}$$

In terms of the wavelength $\lambda$ of the light wave, the FSR is:

$$FSR(\lambda) = \frac{\lambda^2}{2Ln} \tag{4}$$

The bandwidth of the FP filter's transmission is defined as the full width at half maximum ("FWHM") or at 3-dB. It is defined by the following equation:

$$B = \frac{1-r}{\sqrt{r}} \frac{c}{2\pi nL} \tag{5}$$

Relating the bandwidth to the mode spacing FSR yields the finesse F:

$$F = \frac{FSR}{B} = \frac{\pi\sqrt{r}}{1-r} \tag{6}$$

The transmission profile of the FP cavity is described by the Airy Function:

$$A(\lambda) = \frac{I_0}{1+\left(\frac{2F}{\pi}\sin\frac{2\pi nL}{\lambda}\right)^2}, \tag{7}$$

where $I_0$ is the peak transmission optical intensity.

The above Airy function can be approximated by the following Lorentzian distribution function:

$$L(f) = \frac{I_0}{1+4\left(\frac{f-f_0}{B}\right)^2}, \tag{8}$$

$$\left(\text{for}\frac{f-f_0}{FSR} \ll 1\right)$$

where $f_0$ is the peak transmission frequency.

The 3-dB bandwidth of the Lorentzian distribution is denoted by $$B = \frac{1-r}{\sqrt{r}} \frac{c}{2\pi n L},$$

where r is the reflectivity of the filter mirrors, c the speed of light in a vacuum, and L the length of the filter's cavity (e.g., the cavity 210). This type of filter, which has a Lorentzian transmission profile, is defined as a "Lorentzian filter".

In contrast, the transmission profile of a traditional diffraction grating is described by a Gaussian distribution function:

$$G(f) = I_0 e^{\frac{(f-f_0)^2}{2\sigma^2}}, \quad (9)$$

where σ defines the BW of the Gaussian distribution. This type of filter, with a Gaussian transmission profile, is defined as a "Gaussian filter".

TFPFs and diffraction gratings can both be used to construct OSAs. However, as indicated earlier, one of the major challenges in using a TFP OSA for applications such as DWDM is the relatively broad skirt of the filter's transmission profile compared to the transmission profile of a diffraction grating with the same 3.0-dB bandwidth. The broader skirt of the TFPF means that the filter may too easily see signals from very narrowly spaced, closely adjacent channels, thereby masking the real signal of interest.

Referring now to FIG. 4, therein is shown an example of a Lorentzian filter transmission profile 400, represented by a Lorentzian filter curve 402. As can be seen, the filter has a 3-dB BW of about 6.6 GHz. Away from the main transmission peak, the filter has an ORR of about 23.0 dB at ±50.0 GHz, and an ORR of 29.0 dB at ±100.0 GHz, as represented by the skirt 404.

Figure 5:
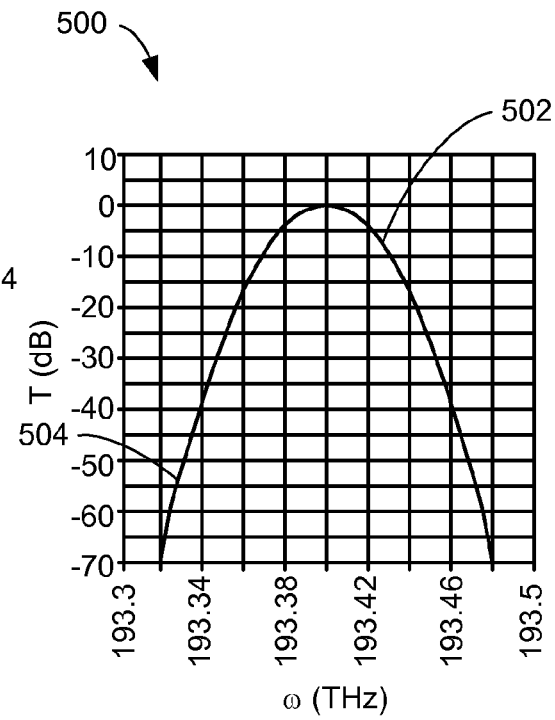
FIG. 5 shows a Gaussian filter transmission profile.

Referring now to FIG. 5, therein is shown an example of a Gaussian filter transmission profile 500, represented by a Gaussian filter curve 502. The filter has a 3-dB BW of about 33.0 GHz. Away from the main transmission peak, the filter has an ORR of about 25.0 dB at ±50.0 GHz (similar to the Lorentzian filter), but an ORR of greater than 70.0 dB at ±100.0 GHz, as represented by the skirt 504.

Figure 6:
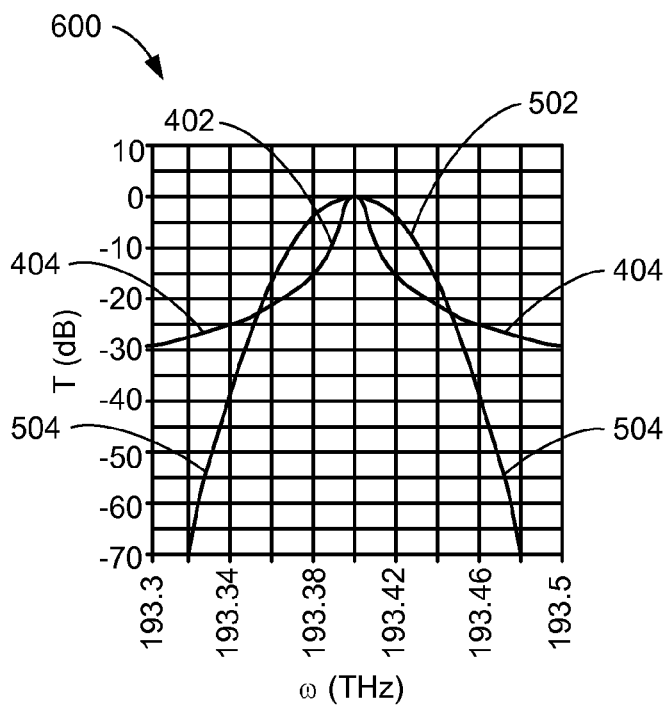
FIG. 6 shows a comparison of the Lorentzian and Gaussian filter curves of FIGS. 4 and 5.

Referring now to FIG. 6, therein is shown a comparison 600 of the Lorentzian and Gaussian filter curves 402 and 502. Although the 3-dB BW of the Lorentzian filter curve 402 is only ⅕ that of the Gaussian filter curve 502, the Lorentzian filter has a much lower ORR at >±50.0 GHz away from the filter's peak transmission due to its broad skirt 404. FIG. 6 thus illustrates the reason that existing OSAs based on FP filters have a much lower DR for OSNR measurements as compared with OSAs based on diffraction gratings.

It is believed that, from the mathematics point of view, any measured optical spectrum is an integral of convolution of the filter function, which the OSA consists of, with the input optical signal function. Therefore, if the input optical signal is denoted by the function R(f), the output spectrum measured with a Lorentzian filter is denoted by $P_L(f)$, and the output spectrum measured with a Gaussian filter is denoted by $P_G(f)$, then the following equations hold:

$$P_L(f) = \int_{-\infty}^{+\infty} R(f_0) L(f - f_0) df_0, \quad (10)$$

$$P_G(f) = \int_{-\infty}^{+\infty} R(f_0) G(f - f_0) df_0, \quad (11)$$

where $L(f-f_0)$ and $G(f-f_0)$ are functions of Lorentzian and Gaussian distributions centered at $f_0$, respectively.

According to the theory of Fourier transformations of integral of convolutions:

$$F[P_L(f)] = F[R(f)] \cdot F[L(f)], \quad (12)$$

$$F[P_G(f)] = F[R(f)] \cdot F[G(f)], \quad (13)$$

where $F[P_L(f)]$, $F[R(f)]$, $F[L(f)]$, $F[P_G(f)]$, and $F[G(f)]$ are the Fourier transformations of $P_L(f)$, $R(f)$, $L(f)$, $P_G(f)$, and $G(f)$, respectively. This leads to the following equation for the deconvolution and reshaping method of the present invention, as further explained below:

$$P_G(f) = F^{-1}\left[\frac{F[P_L(f)]}{F[L(f)]} \cdot F[G(f)]\right], \quad (14)$$

In one embodiment of the present invention, an OSA using a TFPF for the 1470 nm to 1630 nm DWDM S, C, and L band wavelength range was implemented. The TFPF that was used had an FSR of about 180 nm, a finesse of about 7200, and a 3-dB bandwidth of about 25 pm. For such a filter, its ORR at 25.0 GHz and 50.0 GHz away from the filter peak transmission was about 24.5 dB and 30.0 dB, respectively. This means that the highest OSNR that this OSA can measure is less than 24.5 dB for 50.0 GHz spaced DWDM channels, and less than 30.0 dB for 100.0 GHz spaced channels.

Figure 7:
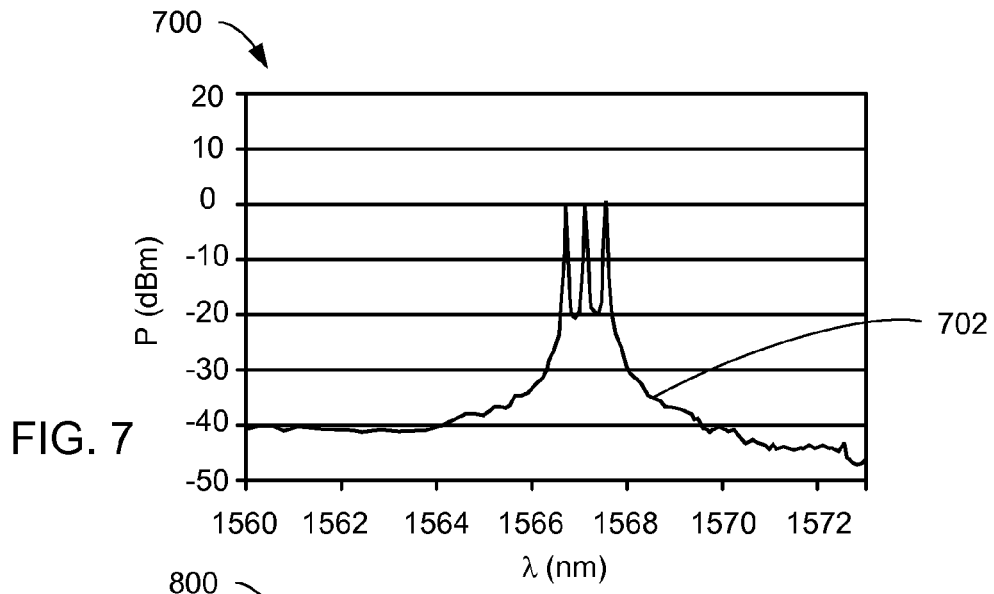
FIG. 7 shows a spectrum before transformation, consisting of three adjacent DWDM channels with balanced powers, measured with a Fabry-Perot optical spectrum analyzer.

Referring now to FIG. 7, therein is shown a spectrum 700, represented by a curve 702, of raw, unprocessed optical data from three adjacent DWDM channels. The spectrum 700 was also measured with a FP OSA.

Figure 8:
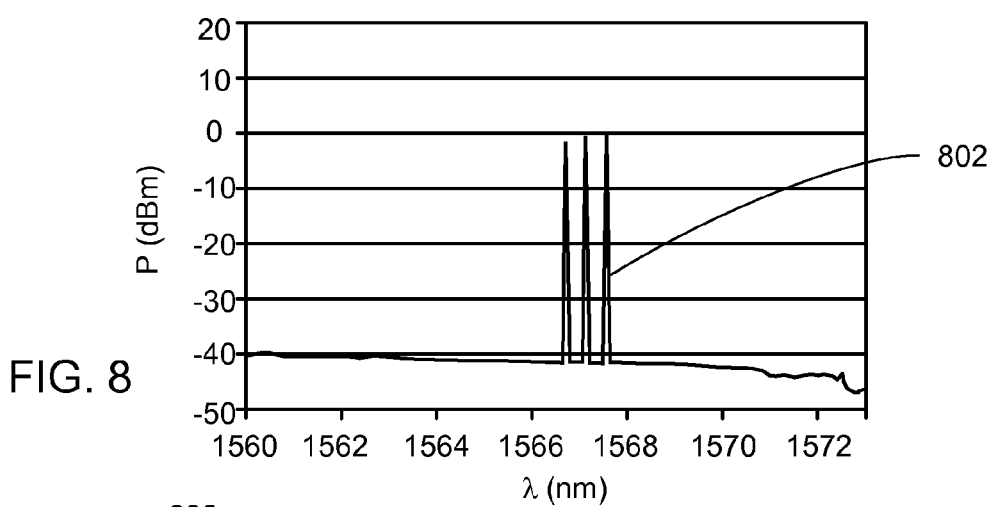
FIG. 8 shows the spectrum of FIG. 7 after fast Fourier transform deconvolution and reshaping processing according to the present invention.

Referring now to FIG. 8, therein is shown a spectrum 800, represented by a curve 802, of the spectrum 700 (FIG. 7) after FFT deconvolution and reshaping processing according to the present invention.

Figure 9:
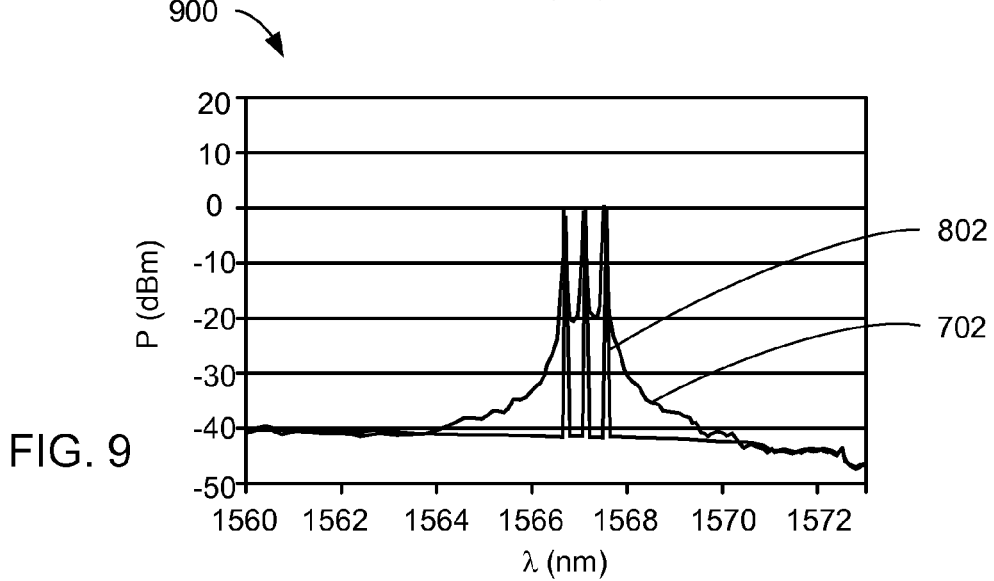
FIG. 9 shows a comparison of the unprocessed and processed curves of FIGS. 7 and 8.

Referring now to FIG. 9, therein is shown a comparison 900 of the unprocessed and processed curves 702 and 802. The deconvoluted and reshaped spectrum 800 (FIG. 8) also shows an increase of ORR at ±25 GHz of more than 15.0 dB, due to the FFT deconvolution and reshaping that has made the filter function's skirt much steeper. The OSNR measured values based on the spectrum 700 (FIG. 7) of raw data are again around 20.0 dB. However, the OSNR measured values based on the spectrum 800 of transformed (processed and reshaped) data are similarly around 40.0 dB due to the FFT deconvolution and reshaping of the present invention.

Figure 10:
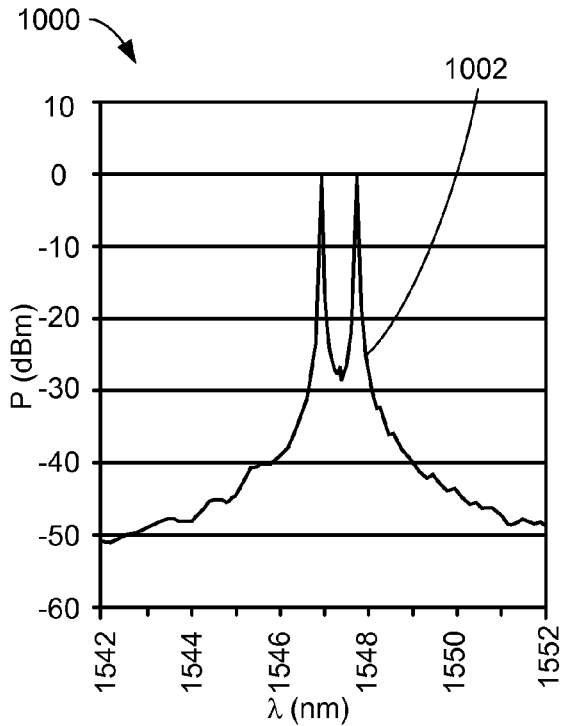
FIG. 10 shows a spectrum before transformation, consisting of three adjacent DWDM channels with imbalanced powers, measured with a Fabry-Perot optical spectrum analyzer.

Referring now to FIG. 10, therein is shown a spectrum 1000, represented by a curve 1002, of raw, unprocessed optical data from three adjacent DWDM channels with imbalanced powers. The power of the middle channel is about −34.5 dBm and the power of the other two channels is about 0.0 dBm. The power imbalance is thus greater than 34.0 dB. The raw data spectrum 1000, measured with a FP OSA, barely resolves the weak power channel since the weak power channel is covered under the skirts of its left and right adjacent DWDM channels.

Figure 11:
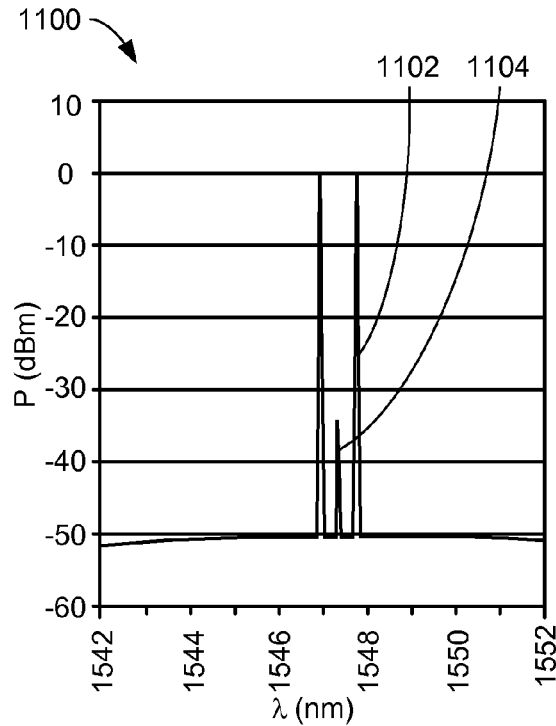
FIG. 11 shows the spectrum of FIG. 10 after fast Fourier transform deconvolution and reshaping processing according to the present invention.

Referring now to FIG. 11, therein is shown a spectrum 1100, represented by a curve 1102, of the spectrum 1000 (FIG. 10) after FFT deconvolution and reshaping processing according to the present invention. The deconvoluted and reshaped spectrum 1100 clearly resolves the weak power channel 1104. The power cross talk has been almost completely removed by the FFT deconvolution and reshaping, which gives a much better contrast for the weak power channel 11104.

Figure 12:
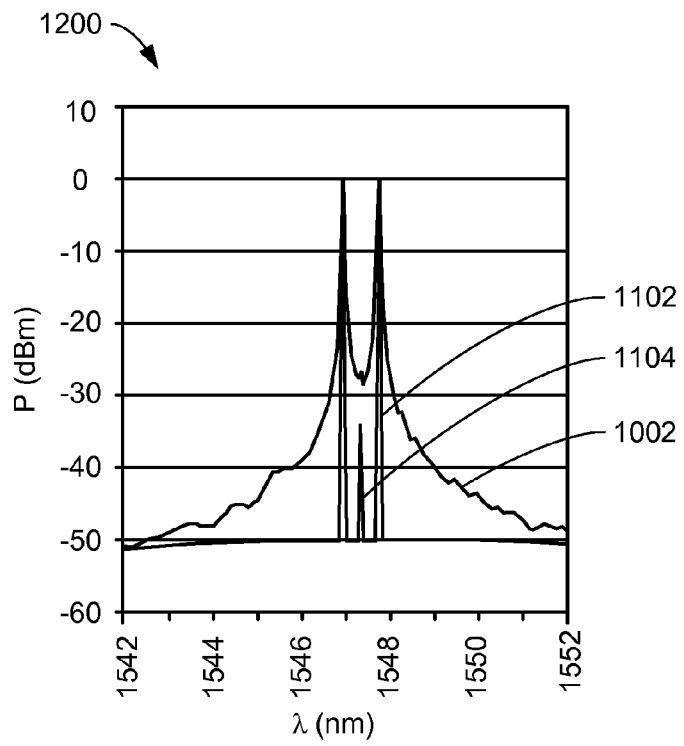
FIG. 12 shows a comparison of the unprocessed and processed curves of FIGS. 10 and 11.

Referring now to FIG. 12, therein is shown a comparison 1200 of the unprocessed and processed curves 1002 and 1102.

Figure 13:
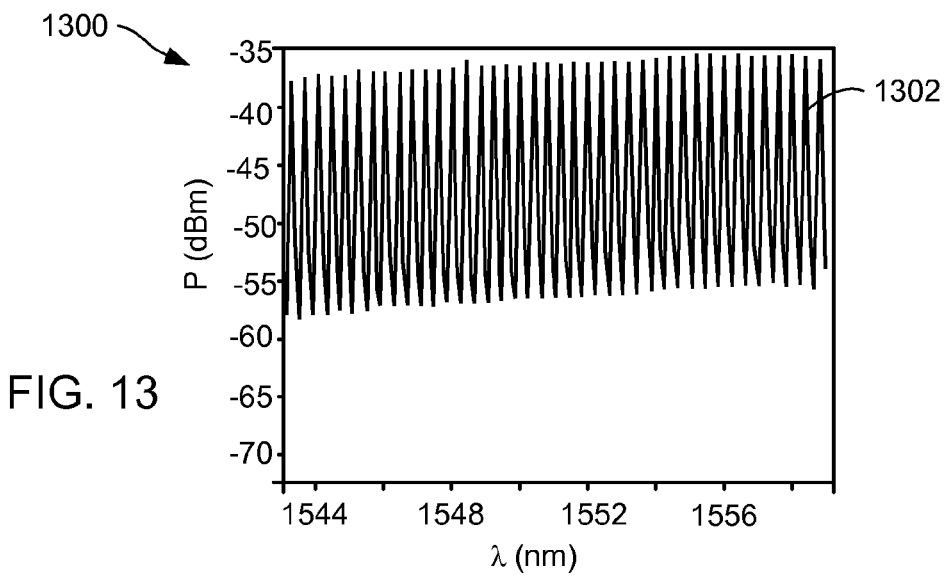
FIG. 13 shows a raw, unprocessed optical spectrum that includes more than forty 50-GHz-spaced dense wavelength division multiplexing channels, measured with a Fabry-Perot optical spectrum analyzer.

Referring now to FIG. 13, therein is shown a spectrum 1300, represented by a curve 1302, of a raw, unprocessed optical spectrum that includes more than forty 50-GHz-spaced DWDM channels. The spectrum 1300 was measured with a FP OSA.

Figure 14:
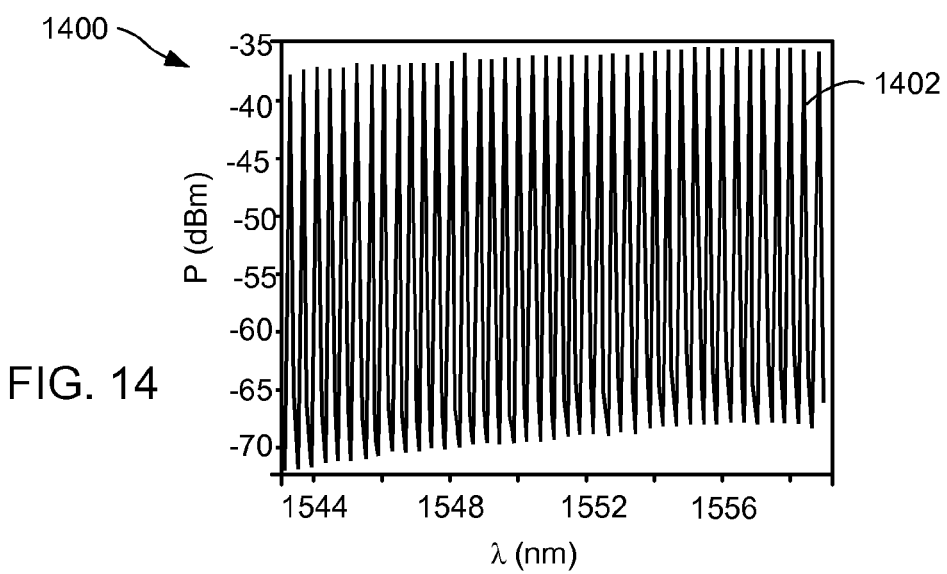
FIG. 14 shows the spectrum of FIG. 13 after fast Fourier transform deconvolution and reshaping processing according to the present invention.

Referring now to FIG. 14, therein is shown a spectrum 1400, represented by a curve 1402, of the spectrum 1300 (FIG. 13) after FFT deconvolution and reshaping processing according to the present invention.

Figure 15:
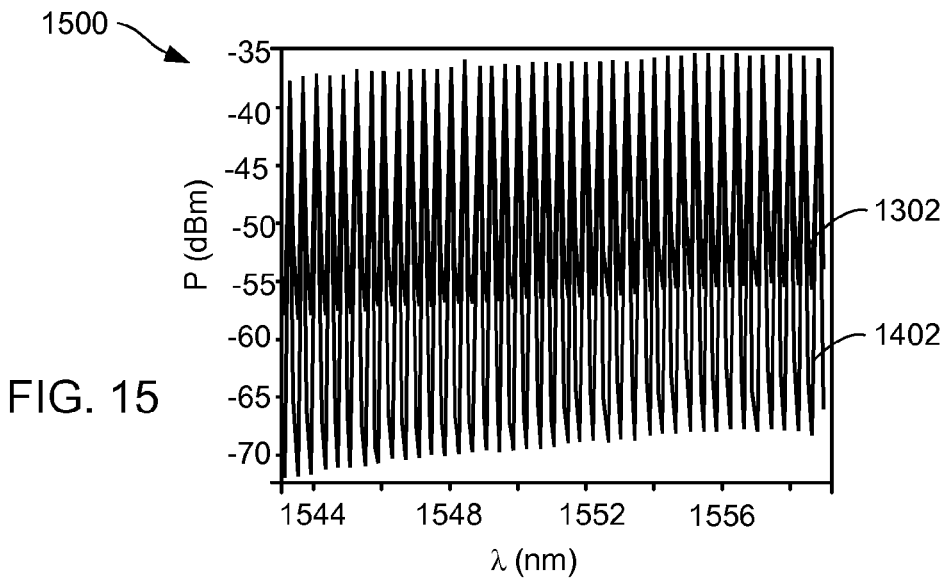
FIG. 15 shows a comparison of the unprocessed and processed curves of FIGS. 13 and 14.

Referring now to FIG. 15, therein is shown a comparison 1500 of the unprocessed and processed curves 1302 and 1402. Again, it is very clear from this comparison that the FFT deconvolution and reshaping method of the present invention is very effective. In particular, the comparison 1500 of the processed curve 1402 with the unprocessed curve 1302 shows that the ORR at the middle of adjacent channels has been enhanced by more than 15 dB.

The FFT deconvolution and reshaping method and apparatus according to the present invention thus enhance the DR of FP filter-based OSAs by "reshaping" the filter's transmission profile. Based on the disclosure of the embodiments of the present invention, it will therefore be clear to one of ordinary skill in the art that a filter's transmission profile can be reshaped in this manner using hardware, software, or a combination of both.

If using hardware to reshape the filter's transmission profile, for example, another filter with a specially designed transmission profile would be used. The additional filter would then be cascaded with the FP filter to provide an overall transmission profile of the two filters that would be like a Gaussian filter. While this approach can be done, it can be difficult.

The present invention therefore teaches a less difficult software FFT deconvolution and reshaping method that functions as a "software filter", rather than a hardware filter. The overall effect is equivalent to cascading a hardware FP filter with such a software filter to achieve the desired overall Gaussian transmission profile.

As disclosed more particularly above, the several steps of the method to deconvolve and reshape the FP filter spectrum of an optical signal, according to the present invention, are thus performed as follows:

1 Characterize the FP filter spectrum as an integral of convolution of an optical input signal function and a filter function. Do a FFT on the FP filter spectrum.
2. Compose a desirable Lorentzian function with optimized bandwidth* and do a FFT on it.
3. Compose a desirable Gaussian function with optimized bandwidth* and do a FFT on it or just compose a desirable function, which is equal to the FFT of a Gaussian function.
4. Divide the result of step 1 by that of step 2.
5. Multiply the result of step 4 by that of step 3.
6. Do an inverse FFT on the result of step 5.

\* "Optimized bandwidth" means a filter bandwidth which makes the later deconvolution most effective.

The end result of the analysis is then a spectrum similar to one that is the output of a Gaussian filter. Thus, a first filter function (e.g., the FP filter function) is removed and a second filter function (e.g., Gaussian) is added having an optimal bandwidth (e.g., one that enhances the DR by more than 15.0 dB at ±25.0 GHz) to reshape the spectrum of the filter output.

Before the FFT deconvolution and reshaping, the position and intensity of the spectrum peaks are first located and saved, when the spectrum is still expressed by the Lorentzian filter. The deconvolution and reshaping is then applied to improve the OSNR and the dynamic range for the optical signal. In this way, the present invention takes advantage of the sharp 3-dB bandwidth of the FP filter to find the fine spectral structures of the input optical signals, and then applies the deconvolution and reshaping process to achieve more accurate OSNR results and better DR of OSNR measurements. The resulting optical spectrum peaks, after this process, have the better, generally Gaussian shape rather than the Lorentzian shape. This can then be repeated for each wavelength of interest in the spectrum of the spectrum signal to determine corresponding discrete signal powers for each of the respective wavelengths of interest.

Figure 16:
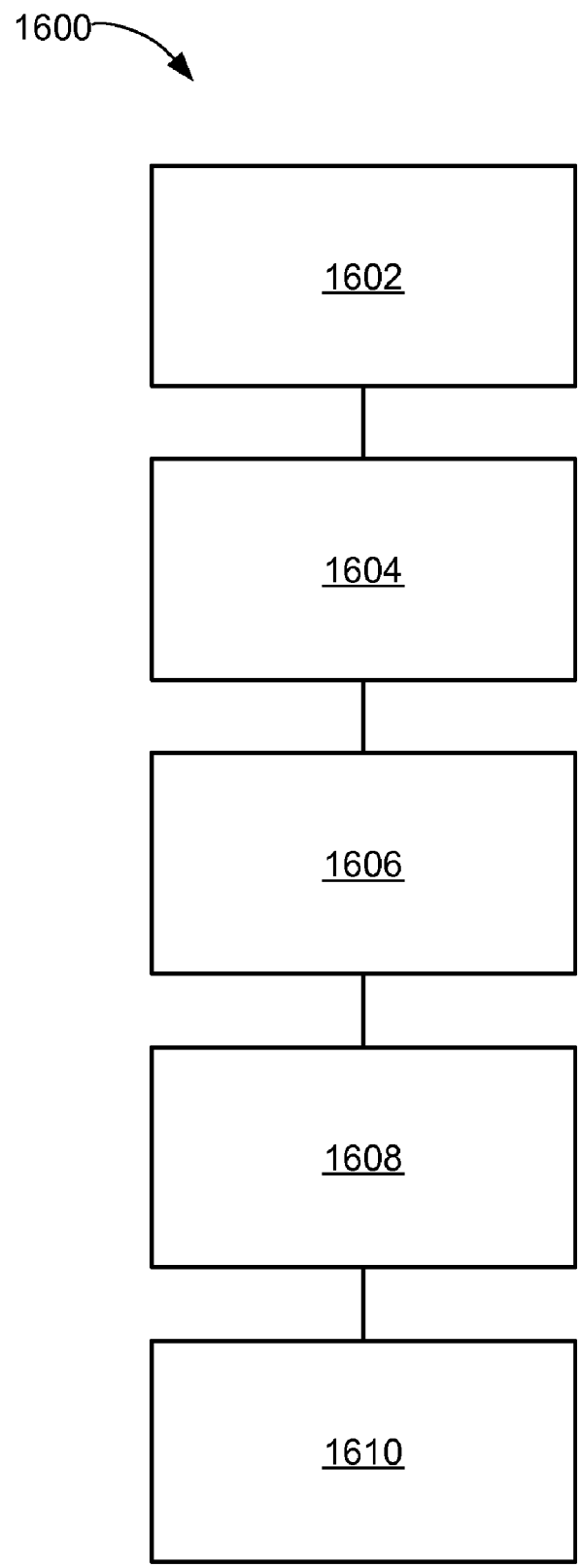
FIG. 16 is a flow chart of a method for Fabry-Perot filter spectrum deconvolution and reshaping in accordance with the present invention.

Referring now to FIG. 16, therein is shown a flow chart of a method 1600 for filter spectrum deconvolution and reshaping in accordance with the present invention. The method 1600 includes providing a filter output of a spectrum signal in a block 1602; determining the position and intensity of the spectrum signal at each peak in a block 1604; characterizing the filter output as an integral of convolution of an input optical signal function and a filter function in a block 1606; performing a transformation on the filter output to deconvolve the two functions in a block 1608; and removing the FP filter function and adding a desirable Gaussian filter function in a block 1610.

Thus, the present invention provides a new, improved, and unobvious OSA based on FP filters and employing deconvolution and reshaping to enhance its ORR and DR for OSNR measurements. In one embodiment, a new and unobvious use of deconvolutions and reshaping enhanced the DR of a FP filter-based OSA by more than 15.0 dB at ±25.0 GHz. The deconvolution and reshaping method of the present invention thus overcomes a major hurdle of FP filters for high DR OSA applications.

As taught and disclosed herein, FP-based optical spectrum analyzers can now provide not only excellent spectral resolution, but also very high DRs for OSNR measurements for DWDM and other challenging applications. Further OSA applications can be similarly benefited, as appropriate and now evident based on the disclosure of the present invention. Other filter functions (e.g., a Butterworth filter) and other deconvolutions and reshaping may also be considered, according to the needs and/or applications at hand, in accordance with the teachings and disclosures herein.

Similarly, based upon the teachings of the present invention, it will now be clear to one of ordinary skill in the art that the deconvolution and reshaping methods and apparatus of the present invention can be applied to other signals and information spectra as well. For example, it can be applied to infrared, microwave, terahertz, and other RF signals and signal development. It can also be applied, for example, to medical optical spectra (e.g., human blood light transmission spectra).

Accordingly, the FP filter spectrum deconvolution and reshaping method and apparatus of the present invention furnish important and heretofore unknown and unavailable solutions, capabilities, and functional advantages for enhancing the DR of FP filter based optical signal analyzers and reshaping the FP filter's transmission profile. The resulting processes and configurations are straightforward, economical, uncomplicated, highly versatile, accurate, sensitive, and effective, and can be implemented by adapting known components for ready manufacturing, application, and utilization.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations, which fall within the scope of the included claims. All matters hithertofore set forth herein or shown in the accompanying drawings are to be interpreted in an illustrative and non-limiting sense.

The invention claimed is:

1. A method for filter spectrum deconvolution and reshaping, comprising:
   providing a filter output of a spectrum signal;
   determining the intensity and wavelength of the spectrum signal at each spectrum peak;
   characterizing the filter output as an integral of convolution of an input spectrum signal function and a first filter function;
   performing a transformation on the filter output to deconvolve the two functions; and
   removing the first filter function and adding a second filter function having a predetermined optimal bandwidth to reshape the spectrum of the filter output.

2. The method of claim 1 wherein providing a filter output of a spectrum signal further comprises measuring a spectrum signal with a tunable Fabry-Perot filter.

3. The method of claim 1 wherein providing a filter output of a spectrum signal further comprises providing a filter output of an optical spectrum signal.

4. The method of claim 1 wherein providing a filter output of a spectrum signal further comprises providing a filter output of a DWDM optical spectrum signal.

5. The method of claim 1 further comprising repeating the providing, the determining, the characterizing, the performing, and the removing for each wavelength of interest in the spectrum of the spectrum signal to determine corresponding discrete signal powers for each of the respective wavelengths of interest.

6. Apparatus for filter spectrum deconvolution and reshaping, comprising:
   a filter for providing a filter output of a spectrum signal;
   a detector for determining the intensity and wavelength of the spectrum signal at each spectrum peak;
   circuitry for characterizing the filter output as an integral of convolution of an input spectrum signal function and a first filter function;
   circuitry for performing a transformation on the filter output to deconvolve the two functions; and
   circuitry for removing the first filter function and adding a second filter function having a predetermined optimal bandwidth to reshape the spectrum of the filter output.

7. The apparatus of claim 6 wherein the filter further comprises a tunable Fabry-Perot filter.

8. The apparatus of claim 6 wherein the filter further comprises a filter for providing a filter output of an optical spectrum signal.

9. The apparatus of claim 6 wherein the filter further comprises a filter for providing a filter output of a DWDM optical spectrum signal.

10. The apparatus of claim 6 further comprising circuitry for repeating the providing, the determining, the characterizing, the performing, and the removing for each wavelength of interest in the spectrum of the spectrum signal to determine corresponding discrete signal powers for each of the respective wavelengths of interest.

* * * * *

UNITED STATES PATENT AND TRADEMARK OFFICE
CERTIFICATE OF CORRECTION

| | | |
|---|---|---|
| PATENT NO. | : 7,409,115 B2 | Page 1 of 1 |
| APPLICATION NO. | : 11/464583 | |
| DATED | : August 5, 2008 | |
| INVENTOR(S) | : Ke-Cai Zeng et al. | |

It is certified that error appears in the above-identified patent and that said Letters Patent is hereby corrected as shown below:

Title page, Item (54) and at Column 1, line 2, under Title section:
    delete "DECONVULTION" and insert therefor --DECONVOLUTION--

Column 9, line 9, delete "11104" and insert therefor --1104--

Signed and Sealed this

Ninth Day of February, 2010

David J. Kappos
*Director of the United States Patent and Trademark Office*